E. A. ROBERTS.
ALMOND HULLER.
APPLICATION FILED OCT. 20, 1916.

1,221,598.

Patented Apr. 3, 1917.

Witness
J. R. Heinrichs

Inventor
E. A. Roberts
By Victor J. Evans
Attorney

UNITED STATES PATENT OFFICE.

EDGAR A. ROBERTS, OF FOLSOM CITY, CALIFORNIA.

ALMOND-HULLER.

1,221,598. Specification of Letters Patent. Patented Apr. 3, 1917.

Application filed October 20, 1916. Serial No. 126,740.

*To all whom it may concern:*

Be it known that I, EDGAR A. ROBERTS, a citizen of the United States, residing at Folsom City, in the county of Sacramento and State of California, have invented new and useful Improvements in Almond-Hullers, of which the following is a specification.

This invention relates to an improvement in hullers for almonds or the like.

The almond nut, as is well known, has a hull in two parts and in riping as a rule the hull loosens from the nut while in some nuts the hull or kernel holds so tight to the shell of the nut that great difficulty is experienced in removing the same from the shell. These last referred to nuts may have their kernels removed by placing the nut in a huller which is generally propelled by power and which process almost invariably results in the breaking of the hull or kernel and so results in a damaged kernel which will not meet with a ready sale and so, not infrequently, such nuts result in a total loss to the owner.

It is therefore to be considered the primary object of my invention to produce a huller that is of an extremely simple nature, being in the shape of a thimble so that the same can be readily positioned upon the thumb or upon one of the fingers of the operator, the said thimble having a roughened or serrated surface and further having its outer end provided with an angularly disposed cutting member or blade that is arranged over the said roughened surface of the finger.

With the above and other objects in view the improvement resides in the construction, combination and arrangement of parts set forth in the following specification and falling within the scope of the appended claim.

Figure 1:
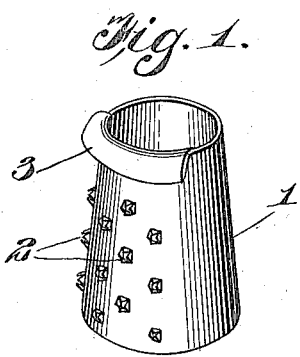
Figure 1 is a perspective view of the improvement.
Figure 2:
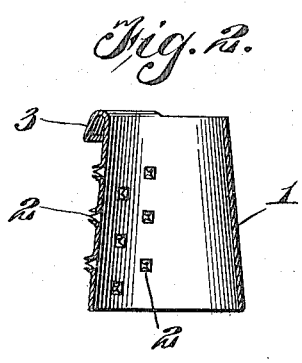
Fig. 2 is a central sectional view through the same.

The improvement may be constructed of any desired material and, as will be noted by reference to the drawing, provides a thimble shaped member that has both of its ends opened. What I will term the inner face of the substantially cone-shaped thimble 1 is provided with a plurality of roughened projections 2 and the outer end of the thimble is provided with an angularly disposed cutting member or knife 3 that is arranged in a line with the roughened projections 2. It will be noted, by reference to the drawing, that the projections 2 comprise substantially cone-shaped hollow projections that have their outer edges roughened and that the said projections are spaced a suitable distance away from each other and are arranged in staggered relation, whereby to provide a comparatively large operating face that is brought into contact with the shell of the nut to effect in filing or separating the sections of the shell. The knife member 3 is formed by providing the thimble 1, at the reduced end thereof, and upon its operating surface with an extending portion which is bent upon itself so that the cutting edge or blade of the said member 3 is arranged substantially in a line with the outer surface of the member 1, and this knife 3 is adapted to be inserted between the sections of the shell of the nut to separate the same without necessitating the application of the roughened projections or what may be strictly termed file members.

From the above description, taken in connection with the accompanying drawing, the simplicity of the device, as well as the advantages thereof will, it is thought, be apparent to those skilled in the art to which such invention appertains without further detailed description.

Having thus described the invention, what I claim is:

In an almond huller, a conical thimble having its reduced end, upon one of its sides, extended and the said extension being bent upon itself over the thimble and substantially in a line with the plane of the thimble to provide a knife member and the said thimble upon the side thereof provided with the said knife having angularly arranged substantially cone-shaped outwardly extending projections, the outer edges of which being roughened, all as and for the purpose set forth.

In testimony whereof I affix my signature.

EDGAR A. ROBERTS.

Copies of this patent may be obtained for five cents each, by addressing the "Commissioner of Patents, Washington, D. C."